(12) United States Patent
Yang et al.

(10) Patent No.: US 12,404,456 B2
(45) Date of Patent: Sep. 2, 2025

(54) STANDING COKE-MAKING FURNACE AND COKE-MAKING SYSTEM

(71) Applicant: Xi'an Thermal Power Research Institute Co., Ltd, Xi'an (CN)

(72) Inventors: Chenglong Yang, Xi'an (CN); Yang Li, Xi'an (CN); Hanchen Zhao, Xi'an (CN); Ming Cai, Xi'an (CN); Chenguang Jia, Xi'an (CN); Mingyu Yao, Xi'an (CN); Jun Zhang, Xi'an (CN); Liang Chu, Xi'an (CN); Yi Cui, Xi'an (CN); Hongqing Zhang, Xi'an (CN); Jie Guo, Xi'an (CN); Zaisong Yu, Xi'an (CN); Faguang Liang, Xi'an (CN)

(73) Assignee: XI'AN THERMAL POWER RESEARCH INSTITUTE CO., LTD, Xi'an (CN)

( * ) Notice: Subject to any disclaimer, the term of this patent is extended or adjusted under 35 U.S.C. 154(b) by 203 days.

(21) Appl. No.: 18/337,582

(22) Filed: Jun. 20, 2023

(65) Prior Publication Data
US 2024/0240089 A1    Jul. 18, 2024

(30) Foreign Application Priority Data

Jan. 13, 2023    (CN) .......................... 202310064838.6

(51) Int. Cl.
| | | |
|---|---|---|
| *C10B 57/00* | (2006.01) | |
| *C10B 3/00* | (2006.01) | |
| *C10B 29/02* | (2006.01) | |
| *C10B 39/00* | (2006.01) | |
| *C10B 49/02* | (2006.01) | |
| *C10B 53/00* | (2006.01) | |

(52) U.S. Cl.
CPC .............. *C10B 57/005* (2013.01); *C10B 3/00* (2013.01); *C10B 29/02* (2013.01); *C10B 39/00* (2013.01); *C10B 49/02* (2013.01); *C10B 53/00* (2013.01)

(58) Field of Classification Search
CPC  C10B 3/00; C10B 29/02; C10B 39/00; C10B 49/02; C10B 53/00; C10B 57/005
See application file for complete search history.

(56) References Cited

U.S. PATENT DOCUMENTS

| | | | | |
|---|---|---|---|---|
| 3,963,582 A | * | 6/1976 | Helm ...................... | C10B 21/20 202/139 |
| 4,260,458 A | * | 4/1981 | Weber ...................... | C10B 3/00 202/124 |
| 5,017,270 A | * | 5/1991 | Janicka ................... | C10B 21/22 202/139 |

(Continued)

FOREIGN PATENT DOCUMENTS

| | | |
|---|---|---|
| CN | 2692153 Y | 4/2005 |
| CN | 201545702 U | 8/2010 |

(Continued)

OTHER PUBLICATIONS

Office Action for CN application 2023100648386, mailed Jun. 19, 2025 (19 pages) English and Chinese language translations.

*Primary Examiner* — Jonathan Miller
(74) *Attorney, Agent, or Firm* — Maginot, Moore & Beck, LLP (57) ABSTRACT

Provided are a standing coke-making furnace, a coke-making system and a method thereof.

9 Claims, 4 Drawing Sheets

(56) References Cited

U.S. PATENT DOCUMENTS

| | | | | |
|---|---|---|---|---|
| 5,114,542 A | * | 5/1992 | Childress | ................ C10B 27/06 |
| | | | | 201/26 |
| 5,259,932 A | * | 11/1993 | Blase | ...................... C10B 21/22 |
| | | | | 202/139 |
| 8,940,136 B2 | * | 1/2015 | Kim | ........................ C10B 15/02 |
| | | | | 202/145 |

FOREIGN PATENT DOCUMENTS

| | | |
|---|---|---|
| CN | 107033939 A | 8/2017 |
| CN | 211496955 U | 9/2020 |

\* cited by examiner

STANDING COKE-MAKING FURNACE AND COKE-MAKING SYSTEM

CROSS-REFERENCE TO RELATED APPLICATIONS

This application is based on and claims priority to the Chinese Patent Application No. 202310064838.6, filed on Jan. 13, 2023, the entire content of which is incorporated herein by reference.

FIELD

The present disclosure relates to the field of a material preparation technology, and in particular to a standing coke-making furnace and a coke-making system including the same.

BACKGROUND

Coal is both a fuel and an inexpensive and readily available raw material for preparation of carbon materials. Currently, an activated coke for desulphurization and denitrification is prepared from coal. An existing carbonization and activation apparatus for preparing the activated coke includes a Horizontal Rotary Furnace and a Vertical Slipper Furnace.

The Horizontal Rotary Furnace achieves overturning the raw material by means of enabling a furnace body to rotate at a certain angle, thereby achieving the carbonization and the activation with an activating agent. However, the application of the Horizontal Rotary Furnace suffers from a large footprint, high investment cost and low temperature control accuracy.

The Vertical Slipper Furnace is of an unreasonable structure with a small width of feed channel and large cross-section of refractory brick resulting in a large furnace body size. The process of generating a vapor from the Vertical Slipper Furnace is complex and makes it difficult to control the temperature of the vapor. The Vertical Slipper Furnace is only used for the activation of a post-carbonation material, but is inapplicable for the activation of the raw material, due to a large amount of tar and volatiles produced during the carbonization of the raw material, which lead to scaling of the furnace wall, blockage of gas channels and agglomeration of materials. The activated agent travel path in the Vertical Slipper Furnace is arranged unreasonably, resulting in a slow activation rate and insufficient contact between the activation gas and the post-carbonation material.

SUMMARY

The present disclosure aims to solve at least one of the technical problems in the related art to a certain extent.

In view of the above, the present disclosure provides in embodiments a standing coke-making furnace and a coke-making system including the same.

In a first aspect, there is provided in embodiments a standing coke-making furnace, including a carbonization segment and an activation segment in order from up to down, wherein within a furnace body, the standing coke-making furnace is provided with:

a plurality of feed paths, extending along a vertical direction and spaced in a horizontal direction, wherein each feed path is interconnected between the carbonization segment and the activation segment, each feed path has a first side wall and a second side wall opposite to the first side wall in the horizontal direction, the first side wall is provided with a plurality of first gas orifices for the activation segment that are spaced from up to down, and the second side wall is provided with a plurality of second gas orifices for the activation segment that are spaced from up to down, wherein the plurality of first gas orifices and the plurality of second gas orifices in a same feed path are symmetrical one-to-one in the horizontal direction, and wherein the plurality of first gas orifices and the plurality of second gas orifices respectively arranged at adjacent side walls of two feed paths are spaced in the vertical direction, and a plurality of first gas flues and two second gas flues, wherein each first gas flue is defined by adjacent side walls of two feed paths, and each second gas flue is defined by an outer wall of an outermost feed path and an inner wall of the furnace body, wherein the first gas flue and the second gas flue are each provided with a closed top and a closed bottom, a layer of first sealing segments is arranged between the carbonization segment and the activation segment in both the first gas flue and the second gas flue, a plurality of air supply ports are arranged in the first gas flue and the second gas flue for the activation segment, wherein the air supply port is arranged to be closely adjacent to the first gas orifice or the second gas orifice, the second gas flue is provided with a first inlet for an activating gas and a first outlet for the activating gas in the activation segment, a layer of second sealing segments is arranged in the plurality of first gas flues and one of the two second gas flues, the second sealing segment arranged in the first gas flue is located in the vertical direction between the first gas orifice and the adjacent second gas orifice that are spaced at adjacent side walls of two feed paths, and the layer of second sealing segments is located in the vertical direction between the first inlet and the first outlet, wherein the activating gas enters the second gas flue from the first inlet; enters the outmost feed path through the second gas orifice to activate a carbonized material therein; enters the first gas flue through the first gas orifice, converges with air supplied from the air supply port and then travels upwards along the first gas flue; enters another feed path through the second gas orifice to activate the carbonized material therein; enters another the first gas flue through the first gas orifice, converges with air supplied from the air supply port and then travels downwards along the first gas flue; enters another the feed path through the second gas orifice to activate the carbonized material therein; continues as such to travel forward and finally discharges from the first outlet, thereby allowing the activating gas to travel in a substantial U-shaped path below and above the layer of second sealing segments.

In an embodiment, multiple layers of second sealing segments are arranged in the vertical direction in the plurality of first gas flues and two second gas flues, wherein for adjacent layers, the second sealing segment is alternately arranged in the two second gas flues, thereby allowing the activating gas to travel in a substantial S-shaped path below and above each layer of second sealing segments.

In an embodiment, the vertical distance between the first gas orifice and the adjacent second gas orifice respectively arranged at adjacent side walls of two feed paths, is 5 to 10 times the horizontal width of the feed path.

In an embodiment, the feed path is in gas communication with the first gas flue and the second gas flue through through-holes for the carbonization segment, the feed path is provided with a plurality of feed path air supply ports for the carbonization segment, a plurality of gas flue air supply ports are arranged in the first gas flue and the second gas flue for the carbonization segment, the second gas flue is further provided with a second outlet for a carbonizing gas for the carbonization segment, and the second outlet is connected to a draft fan.

In an embodiment, the second outlet, the first inlet and the first outlet are arranged at the furnace body, the second outlet is arranged at the bottom of the carbonization segment, the first outlet is arranged above the first inlet, and the first inlet is arranged at the bottom of the activation segment.

In an embodiment, the first sealing segment and the second sealing segment are each a closed brick, the first sealing segment is of a vertical height 3 and 6 times a horizontal width of the feed path, and the horizontal width of the feed path is 50 to 150 mm.

In an embodiment, the side wall of the feed path for the carbonization segment is made of a refractory brick with a plurality of through-holes each arranged obliquely inside, and the side wall of the feed path for the activation segment is made of a conventional refractory brick.

In an embodiment, the standing coke-making furnace according to claim 1 further including a cooling segment located below the activation segment in the furnace body, wherein the feed path is in communication with a feed inlet 7 at the top of the furnace body, the feed path is in communication with the cooling segment and an activated coke outlet at the bottom of the furnace body, and the cooling segment is provided with a cooling coil.

In a second aspect, there is provided in embodiments a coke-making system, including:

a coke-making furnace as described above in any embodiment of the first aspect, and a waste heat boiler, provided with a gas inlet, a gas outlet, a cool water inlet and a vapor outlet, wherein the gas inlet is connected to both the second outlet and the first outlet, the gas outlet is connected to the draft fan, the cool water inlet is connected to a water feed pump, and the vapor outlet is connected to the first inlet.

According to embodiments of the present disclosure, the standing coke-making furnace has the following advantages:

(1) According to embodiments of the present disclosure, the standing coke-making furnace enables the activation and carbonization to be carried out in one apparatus, reducing a footprint of coke-making furnace in the related art, improving a yield rate of coke and reducing apparatus investment costs. Specifically, an activated coke with high porosity is prepared directly from the raw coal by the interconnected carbonization segment and activation segment in the furnace body from up to down, in which the raw coal is carbonized and activated through the carbonization segment and the activation segment in turn under gravity.

(2) The activating gas penetrates the carbonized material in the horizontal direction during the activation process, thereby reducing an activation time and improving an activation effect. Specifically, the plurality of first gas orifices and the plurality of second gas orifices in the same feed path are symmetrical one-to-one in the horizontal direction, such that the activating gas penetrates into a carbonized material layer in the feed path through the activating gas orifices thereby activating the carbonized material in a short and efficient way.

(3) Low consumption of the activating gas. The multiple layers of second sealing segments are located in the vertical direction between the first inlet and the first outlet and spaced from each other, where for adjacent layers, the second sealing segment is alternately arranged in the two second gas flues, thereby allowing the activating gas to travel in a substantial S-shaped path below and above each layer of second sealing segments in the plurality of first gas flues and the two second gas flues for the activation segment, such that the activating gas is in full contact with the carbonized material, thereby improving utilization of the activating gas. According to embodiments of the present disclosure, the standing coke-making furnace requires only 10-20% of the activating gas of a conventional Slipper Furnace for the same amount of the raw material.

(4) Avoiding tar blockage in the carbonization segment. The gas flue and the feed path are each provided with the air supply ports for the carbonization segment; and the second outlet is connected to the draft fan, such that under a negative pressure provided by the draft fan, the tar produced in the carbonization segment is drawn into the gas flue to burn with the supplemented air and is discharged from the carbonization segment, thereby avoiding scaling of the furnace wall, blockage of gas channels and agglomeration of materials.

BRIEF DESCRIPTION OF THE DRAWINGS

FIG. 5 is a schematic diagram showing respective principles of a conventional contacting activation and a penetrating activation in an embodiment of the disclosure, where

REFERENCE SIGNS a furnace body 1, a waste heat boiler 2, a draft fan 3, a water feed pump 4, a second outlet 5, a first outlet 6, a first inlet 7, a feed path air supply port 8, a gas flue air supply port 9, a through-hole 10, a feed path 11, a gas flue 12, a first gas flue 121, a second gas flue 122, a first sealing segment 13, an gas orifice 14, a first gas orifice 141, a second gas orifice 142, an air supply port 15, a cooling coil 16, a feed inlet 17, an activated coke outlet 18, a second sealing segment 19, material 20, a carbonization segment 100, an activation segment 200, a cooling segment 300.

DETAILED DESCRIPTION

The embodiments of the present disclosure are described in detail below, and examples of the embodiments are shown in the accompanying drawings. The embodiments described below with reference to the accompanying drawings are illustrative and are intended to explain the present disclosure, but cannot be understood as limiting the present disclosure.

The standing coke-making furnace and the coke-making system including the same according to embodiments of the present disclosure are described below in connection with the accompanying drawings.

Figure 1:
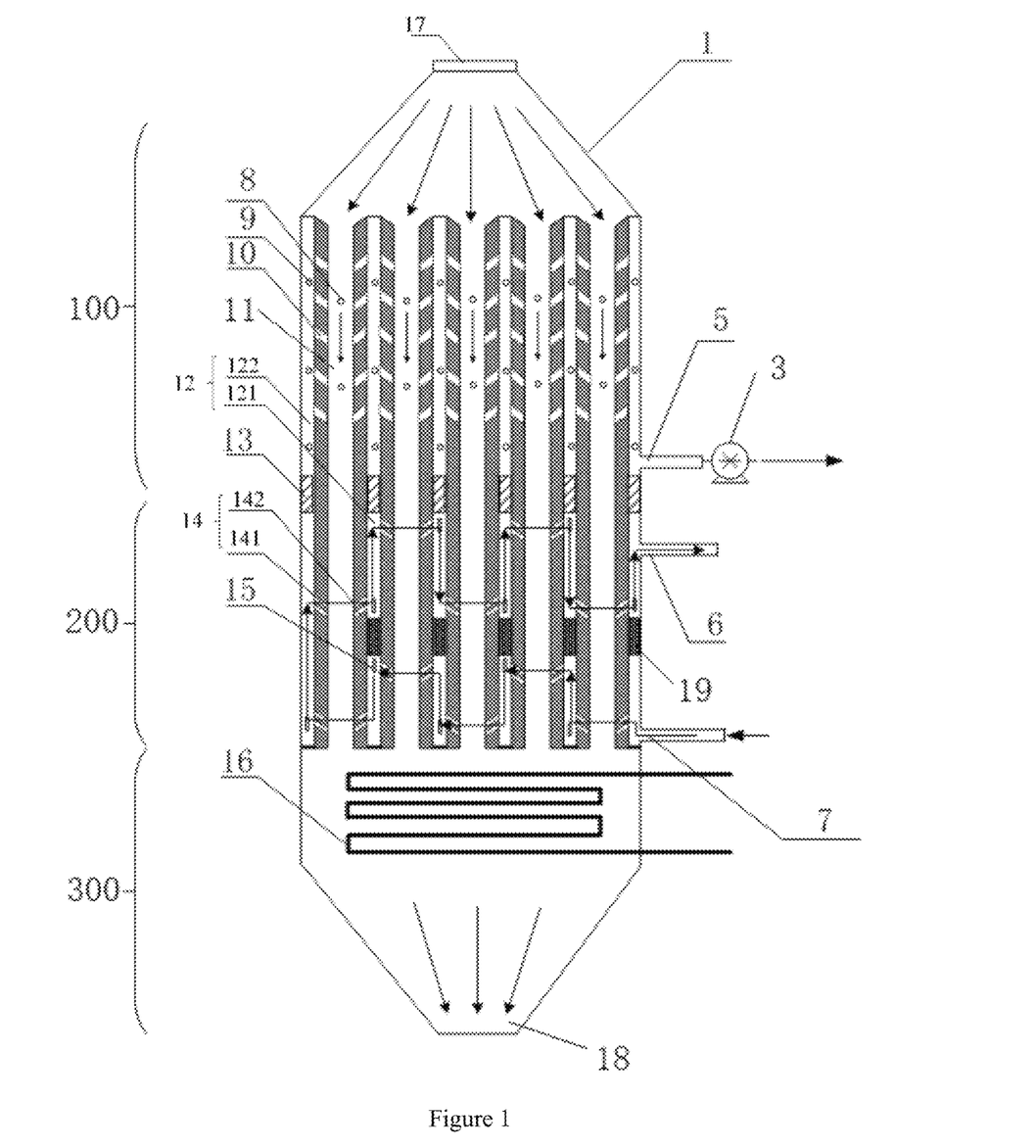
FIG. 1 is a schematic diagram showing a structure of the standing coke-making furnace in an embodiment of the disclosure.

FIG. 1 is a schematic diagram showing a structure of the standing coke-making furnace in an embodiment of the disclosure.

As shown in FIG. 1, in an embodiment of the present disclosure, the standing coke-making furnace, including a carbonization segment 100 and an activation segment 200 in order from up to down, wherein within a furnace body 1, the standing coke-making furnace is provided with:

a plurality of feed paths 11, extending along a vertical direction and spaced in a horizontal direction, wherein each feed path is interconnected between the carbonization segment 100 and the activation segment 200, each feed path has a first side wall and a second side wall opposite to the first side wall in the horizontal direction, the first side wall is provided with a plurality of first gas orifices 141 for the activation segment 200 that are spaced from up to down, and the second side wall is provided with a plurality of second gas orifices 142 for the activation segment 200 that are spaced from up to down, (1) wherein the plurality of first gas orifices 141 and the plurality of second gas orifices 142 in a same feed path are symmetrical one-to-one in the horizontal direction, and (2) wherein the plurality of first gas orifices 141 and the plurality of second gas orifices 142 respectively arranged at adjacent side walls of two feed paths 11 are spaced in the vertical direction, and a plurality of first gas flues 121 and two second gas flues 122, wherein each first gas flue 121 is defined by adjacent side walls of two feed paths 11, and each second gas flue 122 is defined by an outer wall of an outermost feed path 11 and an inner wall of the furnace body 1, wherein the first gas flue 121 and the second gas flue 122 are each provided with a closed top and a closed bottom, a layer of first sealing segments 13 is arranged between the carbonization segment 100 and the activation segment 200 in both the first gas flue 121 and the second gas flue 122, a plurality of air supply ports 15 are arranged in the first gas flue 121 and the second gas flue 122 for the activation segment 200, wherein the air supply port 15 is arranged to be closely adjacent to the first gas orifice 141 or the second gas orifice 142, the second gas flue 122 is provided with a first inlet 7 for an activating gas and a first outlet 6 for the activating gas in the activation segment 200, a layer of second sealing segments 19 is arranged in the plurality of first gas flues 121 and one of the two second gas flues 122, the second sealing segment 19 arranged in the first gas flue 121 is located in the vertical direction between the first gas orifice 141 and the adjacent second gas orifice 142 that are spaced at adjacent side walls of two feed paths 11, and the layer of second sealing segments 19 is located in the vertical direction between the first inlet 7 and the first outlet 6, wherein the activating gas enters the second gas flue 122 from the first inlet 7; enters the outmost feed path 11 through the second gas orifice 142 to activate a carbonized material therein; enters the first gas flue 121 through the first gas orifice 141, converges with air supplied from the air supply port 15 and then travels upwards along the first gas flue 121; enters another feed path 11 through the second gas orifice 142 to activate the carbonized material therein; enters another the first gas flue 121 through the first gas orifice 141, converges with air supplied from the air supply port 15 and then travels downwards along the first gas flue 121; enters another the feed path 11 through the second gas orifice 142 to activate the carbonized material therein; continues as such to travel forward and finally discharges from the first outlet 6, thereby allowing the activating gas to travel in a substantial U-shaped path below and above the layer of second sealing segments 19.

In an embodiment, multiple layers of second sealing segments 19 are arranged in the vertical direction in the plurality of first gas flues 121 and two second gas flues 122, wherein for adjacent layers, the second sealing segment 19 is alternately arranged in the two second gas flues 122, thereby allowing the activating gas to travel in a substantial S-shaped path below and above each layer of second sealing segments 19.

It would be appreciated that, the multiple layers of second sealing segments 19 divides the activation segment 200 into a plurality of activation layers that allow the activating gas to travel in a substantial S-shaped path.

According to embodiments of the present disclosure, the standing coke-making furnace enables the activation and carbonization to be carried out in one apparatus, reducing a footprint of the coke-making furnace in the related art, improving a yield rate of coke and reducing apparatus investment costs.

Specifically, an activated coke with high porosity is prepared directly from the raw coal by the interconnected carbonization segment 100 and activation segment 200 in the furnace body 1 from up to down, in which the raw coal is carbonized and activated through the carbonization segment 100 and the activation segment 200 in turn under gravity.

The multiple layers of second sealing segments are located in the vertical direction between the first inlet and the first outlet and spaced from each other, where for adjacent layers, the second sealing segment is alternately arranged in the two second gas flues, thereby allowing the activating gas to travel in a substantial S-shaped path below and above each layer of second sealing segments in the plurality of first gas flues and the two second gas flues for the activation segment 200, such that the activating gas is in full contact with the carbonized material, thereby improving utilization of the activating gas. According to embodiments of the present disclosure, the standing coke-making furnace requires only 10-20% of the activating gas of a conventional Slipper Furnace for the same amount of the raw material.

Figure 2:
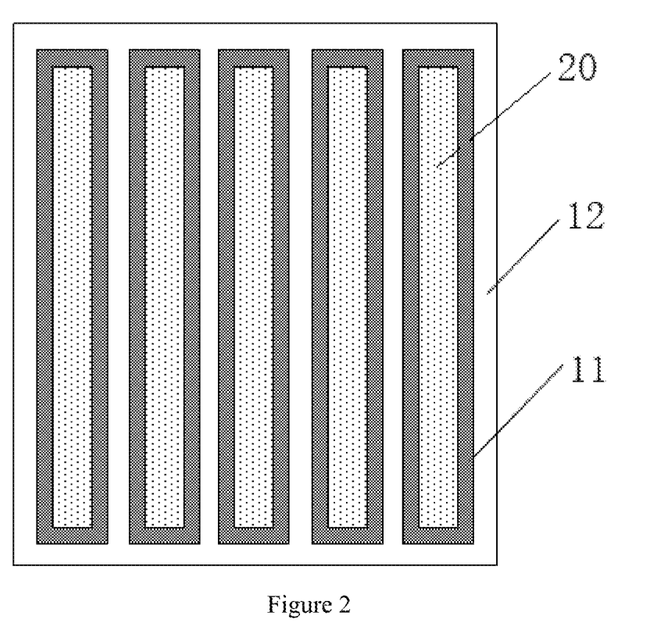
FIG. 2 is a schematic diagram showing a horizontal cross section of the standing coke-making furnace filled with material in an embodiment of the disclosure.

According to embodiments of the present disclosure, a shape of the furnace body 1 is not limited, a main part of the furnace body 1 provided with the carbonization segment 100 and the activation segment 200 and the like may be a cylinder, cuboid, cube, prism, and the like. As an example, the main part of the furnace body 1 is cuboid in shape with a one-piece formed or welded prismatic feed inlet 17 at the top, and a one-piece formed or welded inverse prismatic activated coke outlet at the bottom, as shown in FIG. 1 and FIG. 2.

In an embodiment, for cooling the activated coke obtained by the activation, the standing coke-making furnace further includes a cooling segment 300 located below the activation segment 200 in the furnace body 1, where the feed path 11 is in communication with a feed inlet 17 at the top of the furnace body 1, the feed path 11 is in communication with the cooling segment 300 and an activated coke outlet 18 at the bottom of the furnace body 1, and the cooling segment 300 is provided with a cooling coil. In the cooling coil, a cooling medium, such as cold water, circulates for heat exchange with the activated coke after the activation, which allows the activated coke to be cooled to below 80° C.

According to embodiments of the present disclosure, in order to ensure that the material moves from the carbonization segment 100 to the activation segment 200 and the subsequent cooling segment 300 under gravity, the feed path 11 is of a regular shape, such as cylindrical, rectangular, prismatic, square and the like, which facilitates moving downward of the raw material. As an example, the side wall of the feed path 11 for the carbonization segment 100 is a rectangular path made of the refractory brick with a width of between 50-150 mm, preferably 80-120 mm, more preferably 100 mm. The outermost feed path 11 is spaced from the inner side wall of the furnace body 1, e.g., 50-150 mm apart. Each first gas flue 121 is defined by adjacent side walls of two feed paths 11, and each second gas flue 122 is defined by an outer wall of an outermost feed path 11 and an inner wall of the furnace body 1 (as shown in FIG. 2).

In an embodiment, the activating gas enters the second gas flue 122 from the first inlet 7; enters the outmost feed path 11 through the second gas orifice 142 to activate the carbonized material therein; enters the first gas flue 121 through the first gas orifice 141, converges with air supplied from the air supply port 15 and then travels upwards along the first gas flue 121; enters another feed path 11 through the second gas orifice 142 to activate the carbonized material therein; enters another first gas flue 121 through the first gas orifice 141, converges with air supplied from the air supply port 15 and then travels downwards along the first gas flue 121; enters another feed path 11 through the second gas orifice 142 to activate the carbonized material therein; continues as such to travel forward and finally discharges from the first outlet 6, thereby allowing the activating gas to travel in a substantial U-shaped path below and above the layer of second sealing segments 19. This ensures that the water gas produced during the activation is burned in time and that the activating gas is in full contact with the carbonized material with the shortest traveling path, reducing the amount of the activating gas.

As an example, in order to facilitate the combustion of the water gas produced by the activation and to increase the combustion efficiency, the air supply port 15 is arranged to be closely adjacent to the first gas orifice 141 or the second gas orifice 142.

In an embodiment, the vertical distance between the first gas orifice 141 and the adjacent second gas orifice 142 respectively arranged at adjacent side walls of two feed paths 11, is 5 to 10 times, preferably 7 or 8 times, the horizontal width of the feed path 11. Such the vertical distance cannot be too large or too small. An increase in the vertical distance means a decrease in the number of the activating gas orifice, thus reducing the times of the activating gas penetrating the material layer horizontally and lowering the activation efficiency, while a small vertical distance is not conducive to the water gas produced by the activation burning with air and heating the unreacted activating gas, thereby reducing a temperature in the activation segment 200 and activation efficiency.

Figure 3:
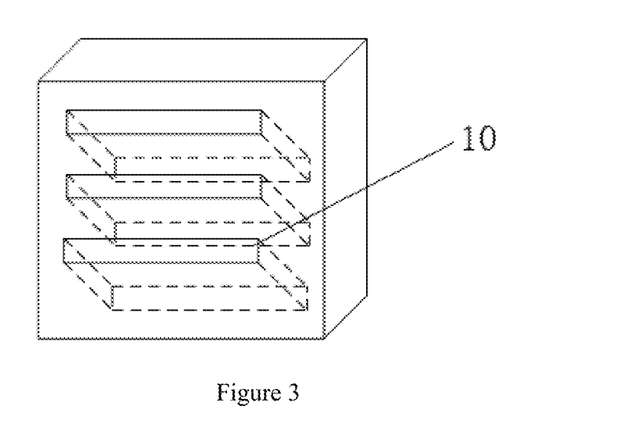
FIG. 3 is a schematic diagram showing a structure of the refractory brick with the through-hole for the standing coke-making furnace in an embodiment of the disclosure.

In an embodiment, in the carbonization segment 100, the feed path 11 is in gas communication with the first gas flues 121 and the two second gas flue 122 in an unlimited manner, such as by means of providing a hole through the side wall or enabling the side wall making of a porous material. As an example, in the carbonization segment 100, the side wall of the feed path 11 for the carbonization segment is made of a refractory brick with the through-hole 10 arranged obliquely (as shown in FIG. 3), where the refractory brick may be a corundum or silicon carbide refractory brick, etc.

In an embodiment, the feed path 11 is provided with a plurality of feed path air supply ports 8 for the carbonization segment 100, a plurality of gas flue air supply ports 9 are arranged in the first gas flue 121 and the second gas flue 122 for the carbonization segment 100, the second gas flue 122 is further provided with a second outlet 5 for a carbonizing gas for the carbonization segment 100, and the second outlet 5 is connected to a draft fan 3. A large amount of tar is separated out from the raw coal in the carbonization segment 100 during a heating process. The second outlet 5 is connected to a draft fan 3, allowing the tar and other volatile components produced in the carbonization segment 100 to be drawn into the gas flue under a negative pressure provided by the draft fan 3. Accordingly, the tar burns with the air supplied in the gas flue rapidly, thereby avoiding blockage caused by tar condensation.

As an example, to facilitate the tar entering the gas flue for combustion, the through-hole 10, first gas orifices 141, and the second gas orifices 142 are arranged downwards obliquely from the outside to the inside of the feed path 11.

In an embodiment, the second outlet 5, the first inlet 7 and the first outlet 6 are arranged at the furnace body 1. The second outlet 5 may be arranged at any position, such as at the top, middle or bottom of the carbonization segment 100. In order to ensure the largest contact area between the activating gas and the carbonized material in the feed path 11, the first inlet 7 may be arranged at the bottom of the activation segment 200, while to avoid mixing of the activating gas and the water gas, the first inlet 7 is preferably keep a proper distance from the first outlet 6, e.g., arranging the first inlet 7 and the first outlet 6 at different sides of the furnace body 1 and/or arranging the first outlet 6 above the first inlet 7 sufficiently. As an example, the second outlet 5 is arranged at the bottom of the carbonization segment 100, the first inlet 7 is arranged at the bottom of the activation segment 200 and the first outlet 6 is arranged at the top of the activation segment 200.

Figure 4:
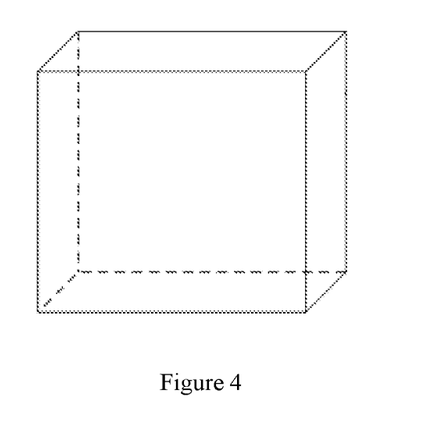
FIG. 4 is a schematic diagram showing a structure of the conventional refractory brick for the standing coke-making furnace in an embodiment of the disclosure.

In an embodiment, in the activation segment 200, the side wall of the feed path 11 is made of an ordinary refractory brick, whose structure is shown in FIG. 4. The first sealing segment 13 and the second sealing segment 19 are both a closed brick filled within the gas flue 12 including the first gas flue 121 and the second gas flue 122. The closed brick is a solid heat resistant brick, such as a solid corundum refractory brick or a silicon carbide refractory brick and the like. The first sealing segment 13 is of a vertical height 3 and 6 times, preferably 3.5 times, a horizontal width of the feed path 11. The second sealing segment 19 is of a vertical height less than the vertical distance between the first gas orifice 141 and the adjacent second gas orifice 142 respectively arranged at adjacent side walls of two feed paths 11. For example, the vertical height of the second sealing segment 19 is ½ to ¾, preferably ⅝, of the vertical distance between the first gas orifice 141 and the adjacent second gas orifice 142 respectively arranged at adjacent side walls of two feed paths 11.

It should be noted that there is no limitation on how the feed path air supply port 8, the gas flue air supply port 9 and the air supply port 15 are implemented. For example, the feed path air supply port 8, the gas flue air supply port 9 and the air supply port 15 all may be an air injection line from outside of the furnace body 1 through the side wall into a corresponding part of the furnace body 1 or may be an air jet port connected to an external air source and arranged at a corresponding part of the side wall of the furnace body 1. The above-mentioned implementations are all prior art and will not be repeated here.

The method of operating the standing coke-making furnace according to an embodiment of the present disclosure is illustrated using vapor as the activating gas.

As shown in FIG. 1, the raw coal particles pass through the carbonization segment 100, the activation segment 200 and the cooling segment 300 of the standing coke-making furnace in order from up to down, and the final-produced activated coke is discharged from the bottom of the furnace body 1. The tar and a pyrolysis gas produced during the carbonization are carried by the air supplied from the feed path air supply port 8 and enter the gas flue 12 in the carbonization segment 100 through the through-hole 10. Subsequently, the tar and the pyrolysis gas burn with an air supplied from the gas flue air supply port 9, producing a flue gas moving from up to down and finally discharged through the second outlet 5 at the bottom of the carbonization segment 100.

Figure 5A:
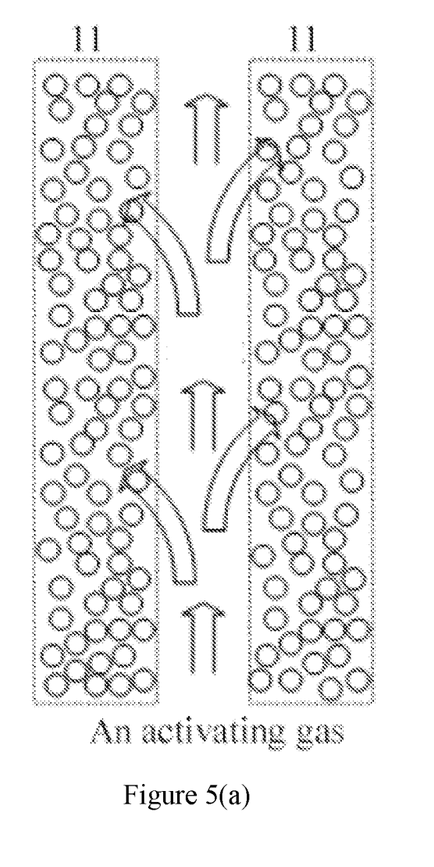
FIG. 5(a) shows the principle of the conventional contacting activation.
Figure 5B:
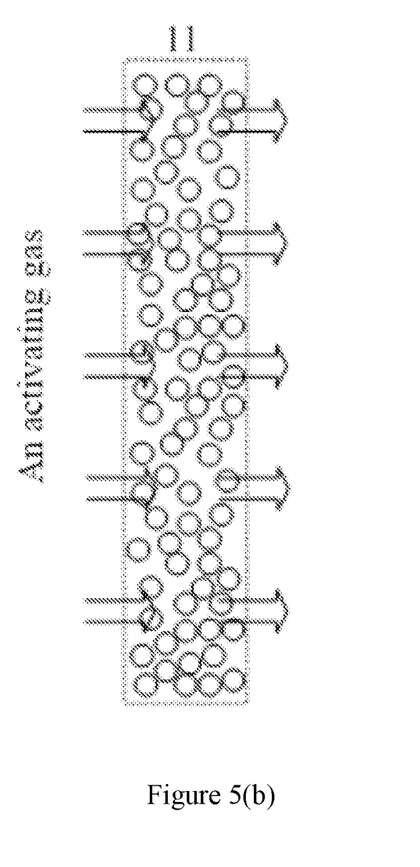
FIG. 5(b) shows the principle of the penetrating activation in an embodiment of the disclosure.

The vapor at a high temperature enters the second gas flue 122 from the first inlet 7; enters the outmost feed path 11 through the second gas orifice 142 to penetrate horizontally through and activate the carbonized material therein (as shown in FIG. 5(b)); enters the first gas flue 121 through the first gas orifice 141, converges with air supplied from the air supply port 15 and then travels downwards along the first gas flue 121; enters another feed path 11 through the second gas orifice 142 to penetrate horizontally through and activate the carbonized material therein; enters another the first gas flue 121 through the first gas orifice 141, converges with air supplied from the air supply port 15 and then travels downwards along the first gas flue 121; enters another the feed path 11 through the second gas orifice 142 to penetrate horizontally through and activate the carbonized material therein; continues as such to travel forward and finally discharges from the first outlet 6, thereby allowing the activating gas to travel in a substantial U-shaped path below and above the layer of second sealing segments 19.

The standing coke-making furnace is controlled to operate at a pressure of −50 to −150 Pa for the carbonization segment 100 by the draft fan 3.

Figure 6:
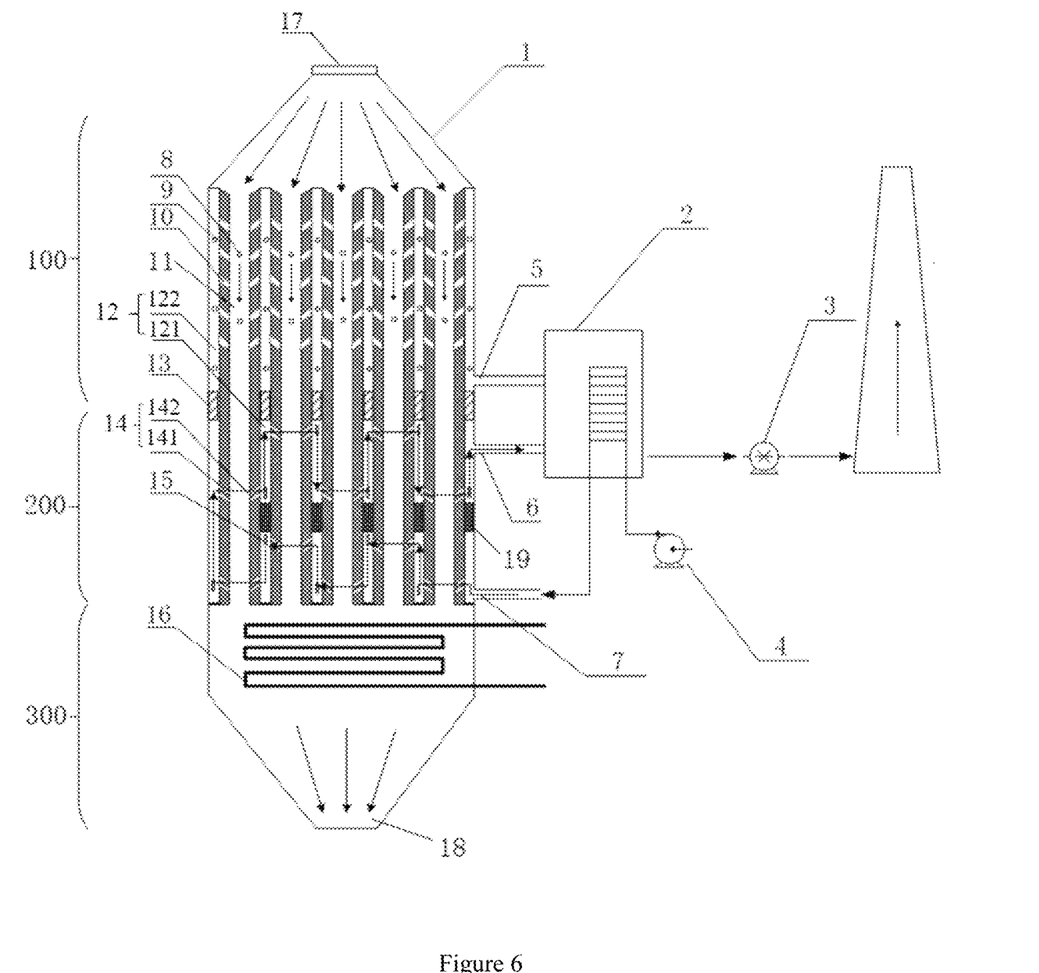
FIG. 6 is a schematic diagram showing a structure of a coke-making system in an embodiment of the disclosure.

According to embodiments of the present disclosure, as shown in FIG. 6, a coke-making system includes a coke-making furnace according to any of embodiments above and a waste heat boiler, provides with a gas inlet, a gas outlet, a cool water inlet and a vapor outlet, where the gas inlet is connected to both the second outlet 5 and the first outlet 6, the gas outlet is connected to the draft fan 3, the cool water inlet is connected to a water feed pump, and the vapor outlet is connected to the first inlet 7.

It should be noted that the waste heat boiler 2 may be provided with one or two gas inlets. For example, the waste heat boiler 2 is provided with one gas inlet that is connected to the second outlet 5 and the first outlet 6 by a first pipeline and a second pipeline via a tee junction. For another example, the waste heat boiler 2 is provided with two gas inlets that are connected to the second outlet 5 and the first outlet 6 by the first pipeline and the second pipeline respectively.

Between the gas outlet and the draft fan 3, between the cool water inlet and the water feed pump 4, and between the vapor outlet and the first inlet 7 all may be connected by a corresponding pipeline.

In the present disclosure, a valve can be installed at each pipeline as required to control the direction of a material passing through the pipeline.

The method of preparing an activated coke (i.e., the method of operating the coke-making system) according to an embodiment of the present disclosure is illustrated as follows.

While a carbonized material is obtain by the carbonization of the row coal in the carbonization segment 100 under a negative pressure, the tar and a pyrolysis gas produced during the carbonization are carried by the air supplied from the feed path air supply port 8, subsequently enter the gas flue 12 for the carbonization segment 100, and burn with the air supplied from the gas flue air supply port 9, thereby producing a flue gas that enters the waste heat boiler 2 through the second outlet 5.

The carbonized material enters the activation segment 200 to be activated in contact with the activating gas to obtain the activated coke. The water gas produced by the activation enters the gas flue 12 and converges with air to burn, heat from which heats the unreacted vapor, and then enters the waste heat boiler 2.

The activated coke is discharged through the activated coke outlet 18 to be collected after being cooled.

In an embodiment, the steps of horizontal penetration of the activating gas through the carbonized material and combustion of the water gas resulted from the activation with the supplied oxygen in the gas flue to burn and heat the unreacted activating gas are repeated from the first inlet 7 to the first outlet 6.

In specific, the vapor at a high temperature produced by the waste heat boiler 2 enters the second gas flue 122 from the first inlet 7; enters the outmost feed path 11 through the second gas orifice 142 to penetrate horizontally through and activate the carbonized material therein (as shown in FIG. 5(b)); enters the first gas flue 121 through the first gas orifice 141, converges with air supplied from the air supply port 15 and then travels downwards along the first gas flue 121; enters another feed path 11 through the second gas orifice 142 to penetrate horizontally through and activate the carbonized material therein; enters another the first gas flue 121 through the first gas orifice 141, converges with air supplied from the air supply port 15 and then travels downwards along the first gas flue 121; enters another the feed path 11 through the second gas orifice 142 to penetrate horizontally through and activate the carbonized material therein; continues as such to travel forward and finally discharges from the first outlet 6, thereby allowing the activating gas to travel in a substantial U-shaped path below and above the layer of second sealing segments 19.

In an embodiment, the standing coke-making furnace is controlled to operate at a pressure of −50 to −150 Pa, preferably −80 to −120 Pa, more preferably −100 Pa, for the carbonization segment 100 by the draft fan 3.

The activated coke is cooled in the cooling segment 300 by the cooling coil to below 80° C. and discharged to obtain the activated coke.

In summary, the present disclosure achieves the following advantages, for example: (1) reduced amount of tar and volatiles produced during the carbonization of the carbonized material, which lead to scaling at the furnace wall, blockage of gas channels and agglomeration of materials; and (2) remarkable increased contact between the activating gas and the activated coke.

In view of the above, the present disclosure provides in embodiments a standing coke-making furnace and a coke-making system including the same, significantly reducing the risk of scaling at the furnace wall by enabling the carbonization segment 100 to be operated under the negative pressure and supplying air to carry the tar out, as well as significantly improving the quality of the activated coke and reducing the energy consumption of coke preparation by the substantially U-shaped path or S-shaped path for the activating gas.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" or the like should be construed to refer to the orientation or position relationship as described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or impliedly indicate quantity of the technical feature referred to. Thus, the feature defined with "first" and "second" may indicate or imply at least one of these features. In the description of the present disclosure, "a plurality of" means two or more than two this features, such as two, three and the like, unless specified otherwise.

In the present disclosure, unless specified or limited otherwise, the terms "mounted", "connected", "coupled", "fixed" and the like are used broadly, and may be, for example, a fixed connection, a detachable connection, or an integrated connection; may be a mechanical connection, may also by an electrical connections or communicate with each other; may also be a direct connection or an indirect connection via an intervening structure; may also be an inner communication of two elements or a mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features in different embodiments or examples as described in this specification may be combined by those skilled in the art, without conflicting with each other.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A standing coke-making furnace, comprising a carbonization segment and an activation segment in order from up to down, wherein within a furnace body, the standing coke-making furnace is provided with:
   a plurality of feed paths, extending along a vertical direction and spaced in a horizontal direction, wherein each feed path is interconnected between the carbonization segment and the activation segment,
   each feed path has a first side wall and a second side wall opposite to the first side wall in the horizontal direction,
   the first side wall is provided with a plurality of first gas orifices for the activation segment that are spaced from up to down, and
   the second side wall is provided with a plurality of second gas orifices for the activation segment that are spaced from up to down,
   wherein the plurality of first gas orifices and the plurality of second gas orifices in a same feed path are symmetrical one-to-one in the horizontal direction, and
   wherein the plurality of first gas orifices and the plurality of second gas orifices respectively arranged at adjacent side walls of two feed paths are spaced in the vertical direction, and
   a plurality of first gas flues and two second gas flues, wherein each first gas flue is defined by adjacent side walls of two feed paths, and each second gas flue is defined by an outer wall of an outermost feed path and an inner wall of the furnace body, wherein the first gas flue and the second gas flue are each provided with a closed top and a closed bottom, a layer of first sealing segments is arranged between the carbonization segment and the activation segment in both the first gas flue and the second gas flue, a plurality of air supply ports are arranged in the first gas flue and the second gas flue for the activation segment, wherein the air supply port is arranged to be closely adjacent to the first gas orifice or the second gas orifice, the second gas flue is provided with a first inlet for an activating gas and a first outlet for the activating gas in the activation segment, a layer of second sealing segments is arranged for the activation segment in the plurality of first gas flues and one of the two second gas flues, the second sealing segment arranged in the first gas flue is located in the vertical direction between the first gas orifice and the adjacent second gas orifice that are spaced at adjacent side walls of two feed paths, and the layer of second sealing segments is located in the vertical direction between the first inlet and the first outlet, wherein the activating gas enters the second gas flue from the first inlet; enters the outermost feed path through the second gas orifice to activate a carbonized material therein; enters the first gas flue through the first gas orifice, converges with air supplied from the air supply port and then travels upwards along the first gas flue; enters another feed path through the second gas orifice to activate the carbonized material therein; enters another one of the plurality of first gas flues through the first gas orifice, converges with air supplied from the air supply port and then travels downwards along the first gas flue; enters another one of the plurality of feed paths through the second gas orifice to activate the carbonized material therein; continues as such to travel forward and finally discharges from the first outlet, thereby allowing the activating gas to travel in a substantial U-shaped path below and above the layer of second sealing segments.

2. The standing coke-making furnace according to claim 1, wherein multiple layers of second sealing segments are arranged in the vertical direction in the plurality of first gas flues and two second gas flues, wherein for adjacent layers, the second sealing segment is alternately arranged in the two second gas flues, thereby allowing the activating gas to travel in a substantial S-shaped path below and above each layer of second sealing segments.

3. The standing coke-making furnace according to claim 1, wherein the vertical distance between the first gas orifice and the adjacent second gas orifice respectively arranged at adjacent side walls of two feed paths, is 5 to 10 times the horizontal width of the feed path.

4. The standing coke-making furnace according to claim 1, wherein the feed path is in gas communication with the first gas flue and the second gas flue through through-holes for the carbonization segment, the feed path is provided with a plurality of feed path air supply ports for the carbonization segment, a plurality of gas flue air supply ports are arranged in the first gas flue and the second gas flue for the carbonization segment, the second gas flue is further provided with a second outlet for a carbonizing gas for the carbonization segment, and the second outlet is connected to a draft fan.

5. The standing coke-making furnace according to claim 4, wherein the second outlet, the first inlet and the first outlet are arranged at the furnace body, the second outlet is arranged at the bottom of the carbonization segment, the first outlet is arranged above the first inlet, and the first inlet is arranged at the bottom of the activation segment.

6. The standing coke-making furnace according to claim 1, wherein the first sealing segment and the second sealing segment are each a closed brick, the first sealing segment is of a vertical height 3 and 6 times a horizontal width of the feed path, and the horizontal width of the feed path is 50 to 150 mm.

7. The standing coke-making furnace according to claim 1, wherein the side wall of the feed path for the carbonization segment is made of a refractory brick with a plurality of through-holes each arranged obliquely inside, and the side wall of the feed path for the activation segment is made of a conventional refractory brick.

8. The standing coke-making furnace according to claim 1, further comprising a cooling segment located below the activation segment in the furnace body, wherein the feed path is in communication with a feed inlet at the top of the furnace body, the feed path is in communication with the cooling segment and an activated coke outlet at the bottom of the furnace body, and the cooling segment is provided with a cooling coil.

9. A coke-making system, comprising:

a coke-making furnace according to claim 4, and a waste heat boiler, provided with a gas inlet, a gas outlet, a cool water inlet and a vapor outlet, wherein the gas inlet is connected to both the second outlet and the first outlet, the gas outlet is connected to the draft fan, the cool water inlet is connected to a water feed pump, and the vapor outlet is connected to the first inlet.

* * * * *